United States Patent
Tong et al.

(10) Patent No.: US 10,138,421 B2
(45) Date of Patent: Nov. 27, 2018

(54) HOT MELT INTUMESCENT MATERIALS FOR FIRE PROTECTION

(71) Applicant: 3M INNOVATIVE PROPERTIES COMPANY, St. Paul, MN (US)

(72) Inventors: Jiangdong Tong, Ontario (CA); Hui Zhu, Ontario (CA)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 9 days.

(21) Appl. No.: 15/033,915

(22) PCT Filed: Oct. 31, 2014

(86) PCT No.: PCT/US2014/063402
§ 371 (c)(1),
(2) Date: May 3, 2016

(87) PCT Pub. No.: WO2015/073229
PCT Pub. Date: May 21, 2015

(65) Prior Publication Data
US 2016/0272893 A1    Sep. 22, 2016

Related U.S. Application Data

(60) Provisional application No. 62/011,672, filed on Jun. 13, 2014, provisional application No. 61/903,130, filed on Nov. 12, 2013.

(51) Int. Cl.
C09K 21/06 (2006.01)
C09K 21/14 (2006.01)
(Continued)

(52) U.S. Cl.
CPC ............. *C09K 21/06* (2013.01); *B32B 15/02* (2013.01); *B32B 15/08* (2013.01); *C08J 5/18* (2013.01);
(Continued)

(58) Field of Classification Search
CPC .......... C09K 21/14; C09K 21/10; C08J 9/108; C08J 9/0085; C08J 9/0095; C08J 9/0066;
(Continued)

(56) References Cited

U.S. PATENT DOCUMENTS

| 4,221,835 A | 9/1980 | Severus-Laubenfeld |
| 4,292,358 A | 9/1981 | Fryer |

(Continued)

FOREIGN PATENT DOCUMENTS

| CN | 101323774 | 12/2008 |
| CN | 101362843 | 2/2009 |

(Continued)

OTHER PUBLICATIONS

Elvax resins Product Data Sheet, Dupont Packaging and Industrial Polymers, retrieved Jul. 13, 2017; http://www.dupont.com//content/dam/dupont/products-and-services/packaging-materials-and-solutions/packaging-materials-and-solutions-landing/documents/elvax_240w.pdf.*

(Continued)

*Primary Examiner* — Frances Tischler
(74) *Attorney, Agent, or Firm* — Steven A. Bern (57) ABSTRACT

A solid intumescent material is made of a of about 30 wt % or less, based on total weight of the intumescent material, of a hot melt thermoplastic or elastomeric resin (e.g. an EVA resin), a reinforcing material (e.g. glass fibers having an aspect ratio of at least about 100), inorganic filler and an intumescent component (e.g. ammonium polyphosphate, pentaerythritol and melamine). The intumescent material may be formed into fire protection barriers of various thicknesses and may be shaped at a temperature well below the activation temperature of the intumescent material to permit conforming the barrier to requirements at a job site.

32 Claims, 1 Drawing Sheet

(51) Int. Cl.

| | | |
|---|---|---|
| *C08J 9/00* | (2006.01) | |
| *C08J 9/10* | (2006.01) | |
| *B32B 15/02* | (2006.01) | |
| *B32B 15/08* | (2006.01) | |
| *C08J 5/18* | (2006.01) | |
| *C09K 21/04* | (2006.01) | |
| *C09K 21/10* | (2006.01) | |
| *C09D 5/18* | (2006.01) | |
| *C09D 7/40* | (2018.01) | |
| *C08K 7/04* | (2006.01) | |

(52) U.S. Cl.
CPC .......... *C08J 9/0023* (2013.01); *C08J 9/0066* (2013.01); *C08J 9/0085* (2013.01); *C08J 9/0095* (2013.01); *C08J 9/108* (2013.01); *C09D 5/185* (2013.01); *C09D 7/70* (2018.01); *C09K 21/04* (2013.01); *C09K 21/10* (2013.01); *C09K 21/14* (2013.01); *B32B 2305/38* (2013.01); *B32B 2307/3065* (2013.01); *C08J 2323/08* (2013.01); *C08J 2331/04* (2013.01); *C08K 7/04* (2013.01)

(58) Field of Classification Search
CPC ........ C08J 9/0023; C08J 2331/04; C08J 5/18; C08J 2323/08; B32B 15/08; B32B 15/02; B32B 2307/3065; B32B 2305/38
See application file for complete search history.

(56) References Cited

U.S. PATENT DOCUMENTS

| | | | | |
|---|---|---|---|---|
| 4,404,297 | A * | 9/1983 | Fishler | C08K 3/32 521/85 |
| 4,493,945 | A | 1/1985 | Feldman | |
| 4,521,493 | A | 6/1985 | Class | |
| 5,404,687 | A | 4/1995 | Blake | |
| 5,580,648 | A | 12/1996 | Castle | |
| 6,031,040 | A | 2/2000 | Horacek | |
| 6,043,304 | A | 3/2000 | Kehal | |
| 6,153,674 | A | 11/2000 | Landin | |
| 6,747,074 | B1 | 6/2004 | Buckingham | |
| 6,809,129 | B2 | 10/2004 | Abu-Isa | |
| 7,217,753 | B2 | 5/2007 | Sinclair | |
| 2003/0139492 | A1 | 7/2003 | Abu-Isa | |
| 2008/0176994 | A1 | 7/2008 | Allermann | |
| 2008/0224105 | A1 | 9/2008 | Green | |
| 2009/0255619 | A1 | 10/2009 | Tong | |
| 2012/0174508 | A1 | 7/2012 | Brooks | |
| 2013/0255893 | A1 | 10/2013 | Stobich | |

FOREIGN PATENT DOCUMENTS

| | | |
|---|---|---|
| CN | 102731931 | 10/2012 |
| DE | 19705736 | 10/1998 |
| EP | 1207183 | 5/2002 |
| EP | 1498463 | 1/2005 |
| FR | 2946259 | 12/2010 |
| GB | 1455251 | 11/1976 |
| JP | 2002-322374 | 11/2002 |
| JP | 2011-025130 | 2/2011 |
| JP | 2012-019001 | 1/2012 |
| WO | WO 2000-058419 | 10/2000 |
| WO | WO 2002-070622 | 9/2002 |
| WO | WO 2002-096996 | 12/2002 |
| WO | WO 2004-076176 | 9/2004 |
| WO | WO 2009-099755 | 8/2009 |
| WO | WO 2010-030685 | 3/2010 |
| WO | WO 2015-073228 | 5/2015 |

OTHER PUBLICATIONS

DuPont Product Information sheet "Thermal Properties of Elvax Meassured by Differencial Scanning Calorimeter", retrieved from the Internet Mar. 18, 2018.*
International Search Report for PCT International Application No. PCT/US2014/063402, dated Feb. 23, 2015, 3 pages.

* cited by examiner

HOT MELT INTUMESCENT MATERIALS FOR FIRE PROTECTION

CROSS REFERENCE TO RELATED APPLICATIONS

This application is a national stage filing under 35 U.S.C. 371 of PCT/US2014/063402, filed Oct. 31, 2014, which claims the benefit of U.S. Provisional Application No. 61/903,130, filed Nov. 12, 2013, and 62/011,672, filed Jun. 13, 2014, the disclosure of which are incorporated by reference in its/their entirety herein.

BACKGROUND

An important part of modern building design is the protection of structural steel such as columns, beams, girders and other steel assemblies from the damaging effect of fire. Steel does not burn, but can lose strength at high temperatures. As a result, a variety of fire protection systems, namely mineral insulants, cementitious sprays and intumescent coatings, have been developed to insulate steel from the effects of fire in order to prolong the time required for steel to reach a temperature of about 538° C., generally by one to two hours, depending upon local fire regulations.

Intumescent coatings are coatings that react under the influence of heat and swell to 10-100 times their original thickness, producing an insulating char that protects the substrate to which the coating is applied from the effects of fire. Because intumescent coatings are needed at a relatively low thickness, as compared with the thickness required for other types of insulating materials to achieve a similar fire protection rating, they are increasingly becoming the preferred choice for structural fire protection. Another attractive feature of intumescent coatings is their smooth and aesthetically pleasing finish. Thin film intumescent coatings therefore allow architects and designers to maximize the creative design possibilities of structural steel.

Typical intumescent coatings usually comprise a minimum of four components: a source of mineral acid catalyst, typically ammonium polyphosphate; a source of carbon, typically pentaerythritol or dipentaerythritol; a blowing agent, typically melamine; and a binder, typically a thermoplastic resin. When an intumescent coating is subjected to heat, a series of reactions occur. The ammonium polyphosphate decomposes to produce polyphosphoric acid, catalyzing the dehydration of pentaerythritol to produce char. The blowing agent also starts to decompose, giving off non-flammable gases that cause the carbon char to foam, thus producing a meringue-like structure that is highly effective in insulating the substrate from heat. The basic function of the binder is to bind together the components of the intumescent coating, so that they may be applied to the substrate and held in intimate contact therewith until required to perform their function in a fire situation. Furthermore, the binder contributes to the formation of a uniform cellular foam structure, since the molten binder helps trap the gases given off by the decomposing blowing agents, thus ensuring a controlled expansion of the char. Binder content must be controlled at certain level. Insufficient binder will result in coating defects such as cracking or delamination, whereas too much organic binder will weaken the char strength and cause higher flame spread rate.

Intumescent coatings are generally categorized into three types: water-based (W/B), solvent-based (S/B), and epoxy-based (E/B). Water-based and solvent-based intumescent coatings are among the most widely used products (over 80% usage in the North American market). These coatings utilize a thermoplastic binder, such as polyvinyl chloride (PVC), polyurethane, polyester, polyvinyl acetate, phenolic resin, acrylic resin, and copolymers of ethylene vinyl acetate, or styrene acrylics. The thermoplastic characteristics of the binder allow the coating to swell significantly (with blowing agent) and form chars 10-100 times the original coating thickness. Therefore, only a relatively thin film is required with water-based or solvent-based coatings. However, significant drawbacks of these types of coatings exist in application and handling.

In application, depending on the coating thickness required for fireproofing, a steel member may require 2 to 10 layer of coats. Since only a limited thickness (usually 40-50 mils or 1.0-1.2 mm per day) can be sprayed in a single application without sagging or peeling, and the coating must be allowed to dry (greatly affected by environmental conditions, such as humidity and temperature) before a second layer can be applied, a project may take up weeks or months to finish. Additionally, a trained applicator must apply the coating to ensure that a uniform thickness is applied. For solvent-based systems, the applicator must be aware of special safety considerations, for example inhalation hazards and flammability. Finally, sprayed on coatings are messy and necessitate extensive cleanup of the job site following installation.

In shipping and handling, water-based intumescent coatings quality deteriorates when subjected to freezing or hot temperatures (above 35° C.) conditions. Due to the instability of certain ingredient in water, water-based intumescent coatings usually have shelf lives of about 6 months.

Epoxy-based coatings (e.g. PPG's Pitt-Char® and Akzo Nobel's Chartek® systems) have great durability and are mostly used for outdoor applications, such as offshore platforms or industrial plants. Because of the thermosetting nature of epoxy resins, epoxy-based coatings swell poorly upon heating (only a few times their original thickness) and consequently require greater amounts to be applied in order to attain the desired fire protection rating. The cost of epoxy systems is usually much higher than water-based and solvent-based systems, meaning that the overall project cost is prohibitive for interior applications. In addition, the aesthetic finish is compromised due to the much greater coating thickness required.

Coatings are often reinforced using, for example, short length pieces of glass fibers or mineral fibers mixed with the coating during application. The random direction of the fibers mixed throughout the coating lends reinforcement, reducing the likelihood of sagging, and allowing greater overall coating thickness to be applied to increase fire protection ratings beyond what can be achieved without reinforcement. These fibers are also well known to enhance char strength during fire. However, incorporating long fibrous materials in intumescent coating is prohibitive due to spraying difficulties and aesthetic concerns.

100% solid intumescent fire proofing materials are described extensively in the literature. US 2008/02241005 A1 describes a liquid curable intumescent system by radical polymerization. US 2012/0174508 A1 describes curable intumescent system using a silane-terminated polyurethane or a silane terminated polyether as binder. U.S. Pat. No. 7,217,753 B2 describes a powder coating system using phenolic resin capable of protecting steel substrate for 2 hours. All these systems are thermosetting, potentially requiring sophisticated installation equipment.

Ammonium polyphosphate, melamine, polyalcohol are well described in literature as non-halogenated fire retarding compound for thermoplastic materials. U.S. Pat. No. 6,043,304 describes a flame-retarded hot-melt adhesive composition, which may be applicable to dimensionally heat-recoverable articles to flow and seal when the articles are heat-recovered in use. U.S. Pat. No. 6,809,129 B2 describes a moldable elastomeric intumescent material comprises chlorinated polyethylene, plasticizers, phosphate based foaming agents, char forming materials, antioxidants, intumescent materials, flame retardant materials, and graphite and/or expandable graphite. JP 2002/322374 describes a moldable intumescent sheet composition for fire protection, which is typically flexible or non-rigid, having an organic binder content typically above 30 wt % of total dry composition and an expansion ratio of up to about 10.

There is a need in the art for improved intumescent materials for fireproofing, which may overcome one or more of the problems associated with current fire resistant materials, for example: time associated with the application of the required thickness of conventional coatings; extended drying time associated with conventional coatings (mostly W/B and S/B); limited installation conditions; damaged coating difficult to repair; short shelf life of water-based coating; necessity for jobsite installation; large thickness associated with E/B; expensive equipment required for installation; and extensive cleaning of job site.

SUMMARY

There is provided a free-standing solid intumescent material comprising about 30 wt % or less, based on total weight of the intumescent material, of a hot melt thermoplastic or elastomeric resin; a reinforcing material; inorganic filler; and, an intumescent component.

There is further provided a process for producing a free-standing solid intumescent material comprising melt compounding a hot melt thermoplastic or elastomeric resin, a reinforcing material, inorganic filler and an intumescent component to form a dry mixture comprising about 30 wt % or less of the resin, based on total weight of the mixture.

There is further provided a use of the free-standing solid intumescent material as a fire protection barrier.

There is further provided a fire protection barrier comprising a film of the solid intumescent material of the present invention.

There is further provided a process for producing a fire protection barrier, comprising: producing a free-standing solid intumescent material by melt compounding a hot melt thermoplastic or elastomeric resin, a reinforcing material, inorganic filler and an intumescent component to form a dry mixture comprising about 30 wt % or less of the resin, based on total weight of the mixture; and, shaping the free-standing solid intumescent material into a fire protection barrier of defined shape.

There is further provided a fire protection system comprising a film of the free-standing solid intumescent material of the present invention coated on a substrate.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

The free-standing solid intumescent material of the present invention provides a useful balance of melt processability to permit homogeneous blending of the components, handling strength to permit transportation and installation of the material, and intumescent properties for fire protection. To be able to homogeneously distribute solid components in less than about 30 wt % resin, especially less than about 20 wt % resin, prior art systems generally employ a liquid carrier (water or organic solvent) to formulate a wet dispersion and the wet dispersion is sprayed on a substrate and then dried. No free-standing solid intumescent material is available in the art with such a low resin:solids ratio. On the other hand, prior art methods that are capable of providing free-standing solid intumescent materials require the use of a large proportion (e.g. greater than about 30 wt %) of resin in order to be processable to achieve sufficient distribution of the solids in the resin. Such prior art materials sacrifice handling strength and intumescent properties. It has now been surprisingly found that a free-standing solid intumescent material having a homogeneous distribution of other components in 30 wt % or less, especially less than about 20 wt %, of a thermoplastic or elastomeric resin binder may be achieved by melt compounding to provide a material having a useful balance between processability, handling strength and intumescent properties.

The free-standing solid intumescent material does not require a substrate to maintain structural integrity. The free-standing solid intumescent material is thermally shapeable at a temperature of about 190° C. or less, preferably about 170° C. or less, preferably about 150° C. or less, preferably about 120° C. or less. The temperature at which the intumescent material may be thermally shaped is preferably in a range of about 30-150° C., preferably about 40-150° C., preferably about 40-120° C., preferably about 80-120° C. or 60-100° C., preferably about 100-120° C. The temperature is sufficiently less than the activation temperature (about 200-250° C.) of the intumescent component that the intumescent material may be safely shaped without activating intumescence. The temperature is also sufficiently low to minimize loss of physical properties of the intumescent material (e.g. flexibility) due to heat while shaping. The intumescent material should be sufficiently rigid at normal ambient temperatures (e.g. about −40° C. to about 40° C.) that it does not lose its shape under these conditions. Shaping involves forming the intumescent material into any desired configuration and includes, for example, extruding, pressing, bending, twisting and other alterations in the configuration of the intumescent material without breaking or unduly cracking the intumescent material. The intumescent material may be initially formed into films or sheets and then, if desired, further shaped for use in specific applications. The intumescent material may have sufficient flexibility that bends or fold of up to 180° may be achieved at elevated temperature without causing undue defects.

The hot melt thermoplastic or elastomeric resin preferably has physical properties that result in the solid intumescent material being thermally shapeable at a temperature of about 150° C. or less, preferably without the loss of physical characteristics (e.g. flexibility, strength (e.g. impact strength, tensile strength), modulus, elongation before break and the like). Physical properties that result in the solid intumescent material being thermally shapeable at a temperature of about 150° C. or less may be one or more of glass transition temperature, melting temperature, crystallinity, melt index, viscosity or molecular weight.

Where melting temperature ($T_m$) is important, the highest $T_m$ should be about 130° C. or lower, preferably about 120° C. or lower, more preferably about 100° C. or lower, yet more preferably about 80° C. or lower. The highest $T_m$ is may be about 40° C. or higher. Where glass transition temperature ($T_g$) is important, the highest $T_g$ should be about 130° C. or lower, preferably about 120° C. or lower, more preferably about 100° C. or lower, yet more preferably about 80° C. or lower. Where crystallinity is important, especially to provide the resin with sufficient rigidity at about 40° C. and below, the crystallinity index should be in a range of about 0% to 40%. Where melt index is important, the melt index should be in a range of about 0.3 to 500, preferably about 1 to 200. Where molecular weight is important, the weight average molecular weight ($M_w$) should be 50,000-1,000,000 g/mol.

Figure 1:
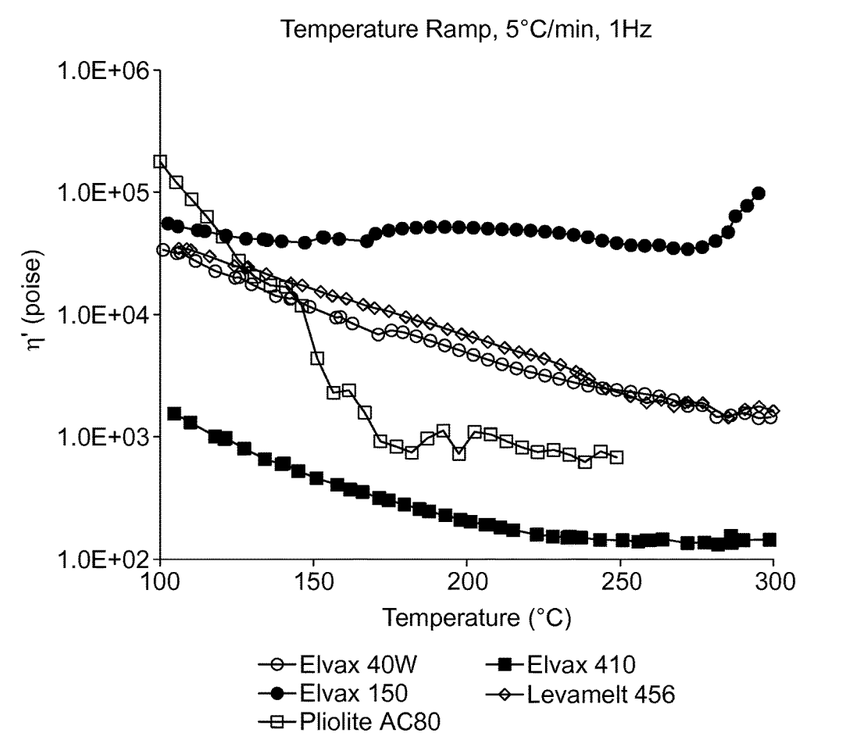
FIG. 1 is a graph of viscosity (poise) vs. temperature (° C.) for various hot melt resins.

Viscosities of hot melt resin binders at processing stage (100-170° C.) and activation stage (200-300° C.) may be important. A low viscosity at the processing stage eases mixing, however too low of a viscosity could cause unwanted flowing of intumescent materials before activation. Meanwhile, a suitable range of viscosity for the hot melt resin binders at the activation stage allows the formation of uniform, strong, carbonaceous foam. Where the viscosity is important, the viscosity at the processing stage (100-170° C.) should be about 100 to 100,000 poise and the viscosity at the activation stage (200-300° C.) should be about 100 to 1,000,000 poise. FIG. 1 shows a graph of viscosity vs. temperature for various hot melt resin binders including Pliolite™ AC80 (a thermoplastic styrene-acrylate copolymer), EVA Elvax™ 40 W (an ethylene vinyl acetate copolymer) EVA Elvax™ 150 (another ethylene vinyl acetate copolymer), Elvax™ 410 (yet another ethylene vinyl acetate copolymer) and Levamelt™ (yet another ethylene vinyl acetate copolymer). It is evident from the viscosity profile that EVA Elvax™ 40 W and EVA Elvax™ 150 would be very suitable resins while Pliolite™ AC80 and Elvax™ 410 would not be. Levamelt™ also has a desirable viscosity profile.

Provided the resin has such physical properties, any suitable thermoplastic or elastomeric polymer type may form the basis for the resin. The resin may comprise one or more polymers. The one or more polymers may be homopolymeric, copolymeric (including block copolymeric), terpolymeric or any blend thereof. The resin preferably comprises thermoplastic elastomer. Some suitable polymer types include vinyl acetate-based polymers, acrylate-based polymers and styrenic polymers. Ethylene-vinyl acetate copolymers and styrene acrylic copolymers are preferred. Ethylene-vinyl acetate copolymers are particularly preferred. In particular, ethylene-vinyl acetate (EVA) copolymers having high vinyl acetate content are preferred. Vinyl acetate content of the EVA is preferably about 20 wt % or greater based on total weight of the copolymer, more preferably about 25 wt % or greater. Vinyl acetate content of the EVA is preferably about 90 wt % or less based on total weight of the copolymer. The vinyl acetate content of the EVA is preferably in a range of about 20-90 wt % based on total weight of the copolymer.

The resin is present in the intumescent material in an amount of about 30 wt % or less, based on total weight of the dry blend, preferably about 25 wt % or less, more preferably about 23 wt % or less, even more preferably about 22 wt % or less, yet more preferably about 21 wt % or less, still even more preferably about 20 wt % or less, most preferably about 19 wt % or less. Preferably, the amount of resin is in a range of about 5-20 wt %, or about 12-20 wt %, or about 5-19 wt %, or about 12-19 wt %. More preferably, the amount of resin is in a range of about 14-18 wt %. The resin functions as a binder for other components of the intumescent material. Too much resin may lead to sagging of the intumescent material, and to too much smoking and flaming when the intumescent material is activated. Not enough resin may render the material unshapeable.

The reinforcing material may be fibers blended into the resin or may be a unitized reinforcing element laminated into or onto the resin. Both fibers and a unitized reinforcing material may be utilized as the reinforcing material. The reinforcing material helps reduce cracking and breaking when shaping and also helps reduce splitting at the seams when the intumescent materials is coated on a substrate. The reinforcing material may comprise organic and/or inorganic materials, preferably one or more inorganic materials. Inorganic materials include, for example, silicon dioxide (e.g. glass, quartz), silicates (e.g. sodium silicate, calcium silicate, natural mineral, synthetic mineral), inorganic carbon (e.g. carbon nanotubes), metal (e.g. steel, aluminum) or mixtures thereof. In addition to the reinforcing material, a fire consumable non-stretchable covering may be coated on an outside surface of the intumescent material to further assist in reducing cracking when the intumescent material is shaped.

Inorganic fibers, especially mineral fibers (e.g. glass fibers, rock fibers, synthetic mineral fibers, carbon fibers), are preferred. Fibers preferably have an aspect ratio of at least about 100, preferably at least about 300, or at least about 500, or at least about 1000. The aspect ratio is preferably up to about 5000. Fibers are preferably present in the material in an amount of about 0.5-50 wt %, based on total weight of the dry blend. Fibers may be present in an amount of about 4-50 wt %, or about 4-35 wt %, or about 4-25 wt %, or about 5-15 wt %. The fibers in the material may be generally randomly oriented (not a web) to thicken the material and to provide physical strength at a desired thickness. It is of particular note that the present invention permits high loading of long, high aspect ratio fibers in the material to provide improved strength while maintaining the ability to thermally shape the material. Water-based or organic solvent-based sprayable intumescent materials of the prior art are generally able to employ only 1-2 wt % of short, low aspect ratio fibers, and have poor strength in comparison.

Unitized reinforcing elements preferably comprise woven or non-woven screens, meshes, scrims, filament tapes, fabrics or felts. The unitized element preferably comprises a metal (e.g. steel, aluminum). The unitized element may be laminated into the resin so that it is surrounded by resin, or the unitized element may be laminated on an outside surface of the resin. One or more unitized elements may be utilized. In addition to providing reinforcement to reduce cracking when shaping the intumescent material, unitized reinforcing elements may also be useful for controlling expansion ratio of the intumescent material and/or useful as anchors so that the intumescent material may be bolted or otherwise mechanically mounted on a substrate.

The inorganic filler may comprise any suitable inorganic filler for fire protection applications. Inorganic fillers include, for example, metal oxides (e.g. titanium dioxide, silicon dioxide), metal carbonates (e.g. calcium carbonate), metal or mixed metal silicates (e.g. clays, talc, mica, kaolin)

and mixtures thereof. The inorganic filler may be present in the material in any suitable amount, for example about 5-25 wt %, or about 10-20 wt %.

The intumescent component is responsible for the majority of the intumescent properties of the material. The intumescent component may comprise one or more of a charring catalyst (i.e. acid donor), charring agent (i.e. carbonific char former) and blowing agent (i.e. spumific). Preferably, at least the charring catalyst and charring agent are utilized in the intumescent component. Any suitable charring catalyst or mixture thereof may be employed. The charring catalyst is an acid donor and may comprise, for example, phosphate-based or non-phosphate-based catalysts. One or more phosphate-based charring catalysts are preferred, for example ammonium polyphosphate, alkyl phosphates, haloalkyl phosphates, melamine phosphate, products of reaction of urea or guanidyl urea with phosphoric acids or product of reaction of ammonia with $P_2O_5$. The charring catalyst is preferably present in the material in an amount of about 25-55 wt %, more preferably about 30-50 wt % or about 35-45 wt %, based on total weight of the dry blend. Any suitable charring agent or mixture thereof may be employed, for example polyhydric alcohols (e.g. starch, dextrin, pentaerythritol (monomer, dimer, timer polymer), phenol-formaldehyde resins or methylol melamine). Pentaerythritol and di-pentaerythritol are preferred. The charring agent is preferably present in the material in an amount of about 5-20 wt %, more preferably about 8-15 wt %, based on total weight of the dry blend. When a blowing agent is used, any suitable blowing agent or mixture thereof may be employed, for example amines or amides (e.g. urea, urea-formaldehyde resins, dicyandiamide, melamine or polyamides). Melamine is preferred. The blowing agent is preferably present in the material in an amount of about 5-20 wt %, more preferably about 8-15 wt %, based on total weight of the dry blend.

Other additives known in the art may be utilized in the free-standing solid intumescent material. Some examples include colorants, oxidation stabilizers, UV stabilizers, etc. Other additives are each typically present in the material an amount of about 0.1-3%. Because the process for producing the intumescent material is a dry melt compounding process, traditional additives required for water and organic solvent-based materials are not required. In addition, decorative and/or protective coatings may be applied to the solid intumescent material.

The intumescent material reacts under the influence of heat to swell to many times its original thickness, producing an insulating char that protects a substrate to which the intumescent material is applied from the effects of fire. The ratio of swollen thickness to unswollen thickness is called the expansion ratio. The intumescent material of the present invention beneficially has an expansion ratio of about 10 or greater, preferably about 15 or greater. The expansion ratio is preferably in a range of about 10-60, or about 15-60, or about 10-40. The expansion ratio is preferably about 15-35. Further, the intumescent material may beneficially protect the substrate from fire for at least about 30 minutes, preferably at least about 2 hours, in accordance with standard methods of fire endurance tests of building construction (CAN/ULC S101, ASTM 119) or with hydrocarbon fire test methods (UL 1709). Fire protection can last for about 3 hours or more. Preferably, fire protection lasts for about 0.5-4 hours, more preferably about 2-4 hours.

It is particularly noteworthy that the intumescent material of the present invention may be formed by melt compounding without the use of a solvent (e.g. water or organic solvent). Dry melt compounding is a solvent-free process that permits direct fabrication of a solid intumescent material eliminating the need for drying the material after formulation, and eliminating the need for additional water-based or organic solvent-based additives. In some cases, though, to facilitate melt compounding it may be useful to include one or more processing aids in the mixture. Such processing aids preferably evaporate during compounding so that they do not remain in the intumescent material. Processing aids include, for example plasticizers (e.g. alcohol esters). Processing aids are preferably utilized in an amount of about 0.1-10 wt %, more preferably about 1-6 wt %, based on total weight of the mixture.

Melt compounding may be accomplished in any suitable hot melt compounding equipment by any suitable method. Hot melt compounding may be performed in one or a combination of mixing and laminating devices including vertical mixers (e.g. Haake mixer), horizontal mixers (e.g. Sigma blade or Kneader), extruders (e.g. twin screw extruders). The compounding may be done in batches or continuously. Compounding may be performed at a temperature of about 190° C. or less, preferably about 170° C. or less, preferably about 150° C. or less. The temperature is sufficiently less than the activation temperature (about 200-250° C.) of the intumescent component that the intumescent material may be safely compounded without activating intumescence.

The free-standing solid intumescent material formed by hot melt compounding is generally viscous but pliable and may be shaped at elevated temperature into any desired shape. The shaped intumescent material retains the desired shape upon cooling. Shaping may be accomplished by any suitable method, for example molding with a mold of suitable design. The solid intumescent material may be subsequently further shaped using molding or other forming techniques into different shapes by further heating (e.g. at a temperature of less than about 150° C.) and cooling to ambient temperature.

In many cases, it may be useful to mold the intumescent material into free-standing films of desired thickness, for example by hot pressing. One advantage of the present intumescent material and process is the ability to provide films of any desired thickness without the need to build up layers of material with intervening delays for drying as in water-based or organic solvent-based spray technologies. Films of the free-standing solid intumescent material produced in accordance with the present invention may have any thickness at the outset. A particular benefit of the intumescent material of the present invention is the ability to produce very thin films providing excellent fire resistance. For example, thin films may have a thickness of up to about 25 mm, or up to about 12 mm (e.g. about 1-25 mm or about 3-12 mm), which is thinner than many commercially producible intumescent coatings. Films may be cast into sheets of virtually any size. The sheets may then be transported to a job site where they can be thermally shaped at a temperature of less than about 150° C. (for example with a hot air gun or a hot iron) to conform to specific requirements of the job at the site. Shaping may involve bending the sheet around various structures. On the job site, the sheets can be shaped to reduce the need for seams and for multiple wrapped layers, which has proven to be problematic in prior art fire protection barriers. Where needed though, a high temperature sealant may be applied to an exposed edge, gap or seam of the sheet. The sealant may comprise a room temperature vulcanizing (RTV) caulking, an intumescent putty or a solid intumescent material such as the one of the present invention. The caulking or putty may be epoxy-based or latex-based, while the solid intumescent material may be hot melt-based.

In some cases, where the specifications are known, sheets may be pre-shaped into non-planar pre-formed shapes and transported to the job site where the pre-formed shapes are directly applied without the need for further shaping. For example, to jacket pipes of known diameter, sheets of the intumescent material may be pre-bent into half-pipe sections corresponding to the pipe's diameter and half-pipe sections applied to each side of the pipes to jacket the pipes. The intumescent material and films of the present invention thereby lead to great savings in cost and time since they can be assembled at the job site without the need to perform a spray-coating operation at the job site.

Installation of the free-standing solid intumescent material at a job site may be accomplished in any suitable manner, for example with the use of an adhesive, a mechanical fastener or both. Mechanical fasteners include, for example, bolts, clamps and magnets. In the case of bolts or similar fastening structures, it is advantageous that the reinforcing material in the intumescent material comprises a unitized element to provide an anchor for the fastener. In such cases it is also advantageous to ensure that the fastening structure is subsequently covered with intumescent material, for example intumescent caulking, after installation. Magnets are generally only useful for coating the intumescent material on ferrous substrates, for example steel. Adhesives may be applied as a tape or a liquid to one or both of the substrate or solid intumescent material and then the solid intumescent material mounted on the substrate. The adhesive may comprise, for example, a curable liquid epoxy or urethane that may be sprayed or painted on a surface, a contact adhesive comprising two components one of which is sprayed on the substrate and the other of which is sprayed on the solid intumescent material, or a pressure sensitive adhesive tape that may be laminated on to the solid intumescent material as a backing layer and optionally provided with a release liner covering at least a portion of the adhesive backing layer that may be peeled away when the intumescent material is positioned. A liquid adhesive (e.g. an epoxy or urethane resin) is preferred because the liquid fills grooves and other irregularities and permits re-positioning sheets of the material on the surface to correctly position the sheet before the adhesive sets.

In one aspect a method of applying a fire protection barrier of the present invention to a substrate in need of fire protection is provided, the method comprising applying a liquid adhesive to a substrate, free-standing solid intumescent material or both and immobilizing the free-standing solid intumescent material in position on the substrate at least temporarily while the adhesive cures. For at least temporarily immobilizing the solid intumescent material in position, a pressure sensitive adhesive (PSA) backing may be used to guide installation. For a ferrous surface, the solid intumescent material may be provided with magnets to temporarily hold the solid intumescent material in position while liquid adhesive layer sets.

The free-standing solid intumescent material is useful as fire protection barriers in buildings or other structures. Some non-limiting examples include the fire proofing of structural steel, electrical cable trays, walls, floors, ceilings, doors, cabinets, bulkheads of ships, transport containers, compartments of vehicles. The intumescent material is especially useful for structural steel, for example columns, beams, girders and other steel assemblies in buildings.

The solid composite intumescent structure may be weather resistant and suitable for exterior exposure and application, an advantage over water-based intumescent coatings. Water-based intumescent coatings weather poorly and lose their intumescent ability over time as they are exposed to humidity, cold and/or heat. In contrast, the present solid composite intumescent structures may weather well, losing relatively little intumescent ability when exposed to extreme conditions of humidity, cold and heat.

EXAMPLES

Materials and Methods

Ethylene-Vinyl Acetate Copolymer (EVA): Grades 1-3 listed below are manufactured by DuPont Company, Willmington, Del., USA. Grade 4 is manufactured by Lanxess corporation, Sarnia, Ontario, Canada.

1) Elvax™ 40W—containing 40 wt % vinyl acetate; melt index (MI) of 52 g/10 min (ASTM 1238, vendor); melting point ($T_m$) of 47° C. (DSC, vendor); glass transition temperature ($T_g$) about −34° C. (DSC measured); crystallinity about 11% (publication); and molecular weight ($M_w$) about 100,000 (GPC, measured).

2) Elvax™ 150—containing 32 wt % vinyl acetate; MI of 43 g/10 min; $T_m$ of 63° C.; $T_g$ about −38° C.; crystallinity about 17%; and $M_w$ about 130,000.

3) Elvax™ 410—containing 18 wt % vinyl acetate; MI of 500 g/10 min; $T_m$ of 73° C.; $T_g$ about −38° C.; crystallinity about 37%; and $M_w$ about 50,000.

4) Levamelt™ 456—containing 45 wt % vinyl acetate; MI of 15-35 g/10 min; $T_m$ of 29° C.; $T_g$ about −30° C.; crystallinity about 9%; and $M_w$ of about 20,000 g/mol.

Styrene/Acrylate copolymer: Pliolite™ AC80 (Eliokem Inc.) $T_g$ of 54° C.; and $M_w$ about 80,000.

Ammonium polyphosphate (charring catalyst): Exolit™ AP422 (Clariant).

Pentaerythritol (charring agent): Charmor™ PM40 (Perstorp Polyols Inc.).

Di-Pentaerythritol (charring agent): Charmor™ DP40 (Perstorp Polyols Inc.).

Melamine (blowing agent): Melamine Grade 003 (DSM Melamine Americas, Inc.)

Titanium dioxide (inorganic filler): Ti-Pure™ R706 (DuPont).

Clay (inorganic filler): Powdered Kaolin Polwhite™ E (IMERYS Minerals Ltd).

Glass fiber: Chopped Strand EC-6-6-SP (Lauscha) with an aspect ratio of 1000.

Rockwool (inorganic fiber): Rockfill™ (Roxul Inc.)

Superwool (inorganic fiber): 607 Plus (Morgan Thermal Ceramics).

Metal mesh: from Gerard Daniel Worldwide, made of galvanized steel; 6.40 mm (¼") mesh size, and 0.69 mm wire diameter.

Texanol™ (processing additive): 2-Methyl-propanoic acid, monoester with 2,2,4-trimethyl-1,3-pentanediol (Eastman Chemical Company).

Mixing Procedure #1 using Haake Mixer—A batch size of 300-420 grams of ingredients is gradually added into the Mixer that is run at 60 RPM and heated to 120-150° C. After the material is fully charged, the mixing continues for 4-5 minutes. The melt temperature and the torque are recorded.

Mixing Procedure #2 using 26-mm Twin Screw Extruder—5 to 10 lb of pre-blended ingredients are charged into the Extruder through a loss-in-weight feeder. The barrel temperatures are set to 120° C. (or specified otherwise), and the extruder is run between 200-500 RPM.

Sheet forming—the materials from the mentioned mixing procedures are pressed at 105-110° C. using Caver hot press machine to the desired thickness.

Burn Test #1—In this method, the hot melt intumescent (HMI) samples are placed in a muffle furnace for 30 minutes while the furnace ramps up from 500° C. to 800° C. Char thicknesses are measured after the burn test to determine the Expansion Ratio by comparing it to the original thickness of the sample.

Burn Test #2—According to ASTM E119.

Burn Test #3—According to UL 1709.

Flexural Test #1—Manually bending the pressed samples against the 90-deg corner of a steel square tube after the subject sheet sample has been preheated to 105-110° C.

Flexural Test #2—This test is conducted on Instron tensile tester which is equipped with a thermal chamber. A U-shape supporting fixture that has a 3″ span and a 1.25″ depth is secured on the base of the Instron machine. A probe similar to ASTM D790 is mounted on to the upper jaw of Instron. Sheets of the HMI samples, 1″ wide and 6″ long, are placed inside the chamber for at least 30 minutes to reach to the test temperature. During this test, the probe, moving at 2″/min, applies a load onto the center of the sample until the sample forms a 90° angle at the contact point. The responding load and the probe's travelling distance are recorded during the test. After the flexural test, the sample is checked for the cracking resulting from the bending.

About Resin Loading:

Hot melt intumescent (HMI) materials with the compositions shown in Table 1 were formulated by hot melt processing in a Haake™ mixer and made into sheets by a Carver press. Table 1 also provides the results of burn and flexural tests on the sheets. The experiments indicated that HMI materials can be obtained by hot melt mixing. Intumescing behaviors were observed. Surface flame, which is undesired in the burn test, was observed when Elvax™ 150 content was at 20% and higher.

About Processing Temperature:

Examples #4 and #4A in Table 2 were of the same formulation. Example #4 was processed in Haake mixer at 120° C. while #4A was through the twin screw extruder with the set temperature at 170° C. The samples from both mixing processes were sheet formed at 105° C., 170° C. and 190° C., respectively. All of them were then preheated to 105° C. for hot bend testing. As seen from Table 2, the experiments show that the same Elvax™ 40W formulation has good bendability when formulated at a processing temperature of 120° C. but not as good when formulated at a processing temperature of 170° C.

TABLE 2

|  | Ex. #4 (g) | (wt %) | Ex. #4a (g) | (wt %) |
|---|---|---|---|---|
| TiO$_2$ Ti-Pure R706 | 44.1 | 12.1% | 44.1 | 12.1% |
| Pentaerythritol Charmor™ PM40 | 41.2 | 11.3% | 41.2 | 11.3% |
| Ammonium polyphosphate Exolit™ AP422 | 144 | 39.6% | 144 | 39.6% |
| Melamine Grade 003 | 41.2 | 11.3% | 41.2 | 11.3% |
| Rockwool™ | 30.0 | 8.3% | 30 | 8.3% |
| EVA Elvax™ 40 W | 63 | 17.3% | 63 | 17.3% |
| Total: | 363.5 | 100.0% | 363.5 | 100.0% |
| Mixing Temperature (° C.) | 120° C. | | 170° C. | |
| 6-mm bend test at 105° C. | | | | |
| Sheet-formed at 105° C. | No crack | | Cracks | |
| Sheet-formed at 170° C. | Cracks | | Cracks | |
| Sheet-formed at 190° C. | Cracks | | Cracks | |

About Resin Type:

Examples #5-8 as shown in Table 3 compare similar HMI formulations of four different resins. As seen from Table 3, experiments show that the formulations containing Elvax™ 410 and Pliolite™ AC80 have expansion ratios less than half of those for Elvax™ 150 and Elvax™ 40W, and that the foam produced with Elvax™ 150 and Elvax™ 40W is more uniform. Expansion ratio may be low for Elvax™ 410 and Pliolite™ AC80 due to their viscosities.

It was further noted that Elvax™ 410 produced too much flame during burning, which may be due to high ethylene content.

TABLE 1

|  | Ex. #1 (g) | (wt %) | Ex. #2 (g) | (wt %) | Ex. #3 (g) | (wt %) |
|---|---|---|---|---|---|---|
| TiO$_2$ Ti-Pure™ R706 | 44.1 | 12.9% | 39.7 | 12.6% | 37.5 | 10.9% |
| Pentaerythritol Charmor™ PM40 | 41.2 | 12.1% | 37.0 | 11.7% | 35.0 | 10.2% |
| Ammonium polyphosphate Exolit AP422 | 144.0 | 42.3% | 129.6 | 41.1% | 122.4 | 35.6% |
| Melamine Grade 003 | 41.2 | 12.1% | 37.0 | 11.7% | 35.0 | 10.2% |
| Clay Polwhite™ E | 10.3 | 3.0% | 9.3 | 2.9% | 8.7 | 2.5% |
| EVA Elvax™ 150 | 60.0 | 17.6% | 63.0 | 20.0% | 105.0 | 30.6% |
| Total: | 340.7 | 100.0% | 315.6 | 100.0% | 343.6 | 100.0% |
| Expansion Ratio (Burn Test #1) | 21 | | 24 | | 26 | |
| Flame on surface of sample during burn test | very limited | | Some | | Significant | |
| Flexural Test #1 with 6-mm samples | Cracks | | Cracks | | No cracks | |

TABLE 3

|  | Ex. #5 | | Ex. #6 | | Ex. #7 | | Ex. #8 | |
| --- | --- | --- | --- | --- | --- | --- | --- | --- |
|  | (g) | (wt %) | (g) | (wt %) | (g) | (wt %) | (g) | (wt %) |
| TiO$_2$ Ti-Pure R706 | 51.5 | 15.4% | 51.5 | 15.4% | 51.5 | 15.4% | 51.5 | 15.1% |
| Pentaerythritol Charmor ™ PM40 | 41.2 | 12.3% | 41.2 | 12.3% | 41.2 | 12.3% | 41.2 | 12.1% |
| Ammonium polyphosphate Exolit ™ AP422 | 144 | 43.0% | 144 | 43.0% | 144 | 43.0% | 144 | 42.2% |
| Melamine Grade 3 | 41.2 | 12.3% | 41.2 | 12.3% | 41.2 | 12.3% | 41.2 | 12.1% |
| EVA Elvax ™ 410 | 56.6 | 16.9% | | | | | | |
| EVA Elvax ™ 150 | | | 56.6 | 16.9% | | | | |
| EVA Elvax ™ 40W | | | | | 56.6 | 16.9% | | |
| Pliolite ™ AC80 | | | | | | | 63.0 | 18.5% |
| Total: | 334.5 | 100.0% | 334.5 | 100.0% | 334.5 | 100% | 340.9 | 100.0% |
| Mixing temperature | 120° C. | | 120° C. | | 120° C. | | 120° C. | |
| Expansion Ratio | 9.5 | | 42 | | 40 | | 18 | |
| Foam appearance | uneven | | uniform | | uniform | | uneven | |
| 6 mm 90° angle bending at 90° C. | No cracks | | No cracks | | No cracks | | Cracks | |

About Reinforcing Mesh:

HMI materials were prepared as shown in Table 4 using a reinforcing mesh. The materials extruded appear to be less flexible when compared to the material of Ex. #7, which was mixed using a Hakke mixer. Experiments indicate that reinforcing mesh improves bendability. These meshes also appear to lower the expansion ratio, although the expansion ratios are still good.

TABLE 4

|  | Ex. #9 | |
| --- | --- | --- |
|  | (g) | (wt %) |
| TiO$_2$ Ti-Pure R706 | 515 | 15.4% |
| Pentaerythritol Charmor ™ PM40 | 412 | 12.3% |
| Ammonium polyphosphate Exolit ™ AP422 | 1440 | 43.0% |
| Melamine Grade 3 | 412 | 12.3% |
| EVA Elvax ™ 40 W | 566 | 16.9% |
| Total: | 3345.0 | 100.0% |
| Twin Screw Extruding | 130° C. | |

|  | Ex. #9 | Ex. #9a | Ex. #9b |
| --- | --- | --- | --- |
| Fiber Glass Mesh | N/A | 3 Layers | No |
| Wire Mesh | N/A | No | 1 layer on top |
| Mesh location | N/A | sandwiched | top |
| 6 mm bending at 90° C. | cracks | no cracks | minor cracks |
| Expansion ratio | 38 | 31 | 31 |
| Foam appearance | uniform | uniform | uniform |

About Fire Proofing:

Examples #10-14 in accordance with the present invention were formulated as shown in Table 5 and were used to conduct fire testing as shown in Table 6.

These fire tests provide insight on i) gaps when the HMI is installed on steel surfaces; ii) the anchoring of HMI to steel surfaces; iii) performance of reinforced HMI; and, iv) general performances of HMI during ASTM119 and UL1709 fire testing standards.

Example #10b illustrates that the use of mesh reinforcing material in the HMI material to maintain the structural integrity of the char can provide up to 3 hours of fire protection.

Examples #11-13 illustrate that different types of inorganic reinforcing materials may be used without the need for mesh to maintain the structural integrity of the char for a long period of time during fire testing. Example #13b illustrates that good fire protection without the use of mesh can be obtained for over 2.5 hours.

Example #10a illustrates that filling gaps between HMI sheets with intumescent putty can serve to protect the steel during fire testing without the need to overlap HMI sheets.

All of the Examples illustrate that epoxy adhesive is very good for anchoring the HMI sheets to steel, but that other methods (e.g. contact adhesive, bolts) work too.

TABLE 5

|  | Ex. #10 | | Ex. #11 | | Ex. #12 | | Ex. #13 | | Ex. #14 | |
| --- | --- | --- | --- | --- | --- | --- | --- | --- | --- | --- |
|  | (g) | (wt %) | (g) | (wt %) | (g) | (wt %) | (g) | (wt %) | (g) | (wt %) |
| TiO$_2$ Ti-Pure R706 | 51.5 | 13.4% | 51.5 | 13.9% | 51.5 | 13.9% | 51.5 | 12.8% | 51.5 | 13.9% |
| Charmor ™ PM40 | 41.2 | 10.7% | 41.2 | 11.1% | | | 41.2 | 10.3% | 41.2 | 11.1% |
| Charmor ™ DP40 | | | | | 41.2 | 11.1% | | | | |
| Exolit ™ AP422 | 144.0 | 37.5% | 144.0 | 38.8% | 144.0 | 38.8% | 144.0 | 35.9% | 144.0 | 38.8% |
| Melamine Grade 3 | 41.2 | 10.7% | 41.2 | 11.1% | 41.2 | 11.1% | 41.2 | 10.3% | 41.2 | 11.1% |

TABLE 5-continued

|  | Ex. #10 | | Ex. #11 | | Ex. #12 | | Ex. #13 | | Ex. #14 | |
| --- | --- | --- | --- | --- | --- | --- | --- | --- | --- | --- |
|  | (g) | (wt %) | (g) | (wt %) | (g) | (wt %) | (g) | (wt %) | (g) | (wt %) |
| Superwool Bulk | 30.0 | 7.8% |  |  |  |  | 58.0 | 14.5% |  |  |
| Rockwool ™ EC-6-6-SP |  |  | 30.0 | 8.1% | 30.0 | 8.1% |  |  | 30.0 | 8.1% |
| Texanol ™ | 8.5 | 2.2% |  |  |  |  |  |  |  |  |
| Polwhite ™ E | 10.5 | 2.7% |  |  |  |  | 8.5 | 2.1% |  |  |
| Elvax ™ 40W | 56.6 | 14.8% | 63.0 | 17.0% | 63.0 | 17.0% | 56.6 | 14.1% | 63.0 | 17.0% |
| Total: | 383.5 | 100.0 | 370.9 | 100.0 | 370.9 | 100.0 | 401.0 | 100.0 | 370.9 | 100.0 |
| Mixer Temperature | 120° C. | | 120° C. | | 120° C. | | 120° C. | | 120° C. | |
| 90 degree Bend of HMI @105° C. | No cracks @ 6-mm thickness | | No cracks @ 4-mm thickness; Cracks @ 6-mm thickness | | No cracks @ 6-mm thickness | | Cracks @ 6-mm thickness | | No cracks @ 6-mm thickness | |
| Char expansion ratio | 32 | | 26 | | 20 | | 31 | | 30 | |

TABLE 6

| HMI | Ex. #10a | Ex. #10b | Ex. #11 | Ex. #12 | Ex. #13 | Ex. #13a | Ex. #14 |
| --- | --- | --- | --- | --- | --- | --- | --- |
| HMI thickness (mm) | 3.4 | 6.6 | 1.9 | 1.9 | 1.9 | 6.6 | 3.4 |
| Anchoring method | Epoxy | Epoxy | Epoxy | Epoxy | Contact | Epoxy | Bolt |
| Gap filling | Yes[1] | No | No | No | No | No | No |
| Mesh Reinforcement | No | Steel mesh | No | No | No | No | Steel mesh |
| Fire Test - ASTM 119 | X |  | X | X | X |  | X |
| Fire Test - UL 1709 |  | X |  |  |  | X |  |
| Steel Plate insulation at back | No[2] | Yes | Yes | Yes | Yes | Yes | No[2] |
| Time to fail (min) | 120+ | 181 | 113 | 111 | 71 | 163 | 120+ |

[1] Two 30 cm long, 7 mm wide gaps were created on sample surface, then filled with water based intumescent putty.
[2] Fire testing involves placing a steel plate coated with the intumescent material in a furnace with the intumescent material facing the flames in the furnace and the uncoated side of the steel plate facing the external environment. Normal testing procedure requires the uncoated side of the steel plate to be insulated to simulate a real environment. In Examples #10a and #14, the insulation on the uncoated side of the steel plate was not in place during the testing.

About Levamelt™:

Example #15 shows HMI materials using Levamelt™ 456, an EVA with low crystallinity and higher VA content comparing to Elvax™ materials, as binder, and reinforced with mineral wool. The materials can be successfully bent at 90° C. The same sheet material can be further reinforced with a layer of wire mesh (Example #15a). Bending of Example #15a at 90° C. results in a very smooth finish.

TABLE 7

|  | Ex. #15 | |
| --- | --- | --- |
|  | (g) | (wt %) |
| TiO$_2$ Ti-Pure R706 | 51.5 | 14.7 |
| Dipentaerythritol Charmor ™ DP40 | 41.2 | 11.7 |
| Ammonium polyphosphate Exolit ™ AP422 | 144.0 | 41.0 |
| Melamine Grade 3 | 41.2 | 11.7 |
| Rockwool ™ | 15.0 | 4.3 |
| Zinc Stearate | 1.8 | 0.5 |
| EVA Levamelt ™ 456 | 56.6 | 16.1 |

TABLE 7-continued

|  | Ex. #15 | Ex. #15a |
| --- | --- | --- |
| Wire Mesh | N/A | 1 layer |
| Mesh location | N/A | top |
| 4 mm bending at 90° C. | minor cracks | no cracks |

The novel features will become apparent to those of skill in the art upon examination of the description. It should be understood, however, that the scope of the claims should not be limited by the embodiments, but should be given the broadest interpretation consistent with the wording of the claims and the specification as a whole.

What is claimed is:

1. A free-standing solid intumescent material comprising:
   (a) 30 wt % or less, based on total weight of the intumescent material, of a hot melt thermoplastic or elastomeric resin, wherein the hot melt thermoplastic or elastomeric resin has
   a $T_m$ of 130° C. or lower;
   a $T_g$ of 130° C. or lower; and
   a viscosity of 1000-100,000 poise at 100° C.-170° C. and 100-1,000,000 poise at 200° C.-300° C.;

(b) 0.5-50 wt % of a reinforcing material comprising fibers blended into the resin, the fibers having an aspect ratio of at least 100;
(c) 5-25 wt % of an inorganic filler; and
(d) an intumescent component comprising 5-20 wt % of a charring agent, 25-55 wt % of a charring catalyst, and 5-20 wt % of a blowing agent,
wherein the free-standing solid intumescent material is formed by a dry hot-melt process and is capable of acting as a fireproofing material.

2. The intumescent material according to claim 1, wherein the free-standing solid intumescent material is thermally shapeable at a temperature of about 150° C. or less, and wherein the hot melt thermoplastic or elastomeric resin has one or more of:
a crystallinity index of 0-40%;
a melt index of 0.3-500; or
a weight average molecular weight ($M_w$) of 50,000-1,000,000 g/mol.

3. The intumescent material according to claim 1, wherein the intumescent material comprises hot melt thermoplastic having a $T_m$ between 40° C. and 130° C.

4. The intumescent material according to claim 1, wherein the hot melt thermoplastic or elastomeric resin comprises an ethylene-vinyl acetate copolymer.

5. The intumescent material according to claim 4, wherein the ethylene-vinyl acetate copolymer comprises vinyl acetate content in a range of 20-90 wt % based on total weight of the copolymer.

6. The intumescent material according to claim 1, wherein the hot melt thermoplastic or elastomeric resin is present in an amount of about 10-19 wt % based on total weight.

7. The intumescent material according to claim 1, wherein the hot melt thermoplastic or elastomeric resin is present in an amount of about 14-18 wt % based on total weight.

8. The intumescent material according to claim 1, wherein the reinforcing material comprises inorganic fibers having an aspect ratio of at least about 300.

9. The intumescent material according to claim 1, wherein the fibers comprise glass fibers.

10. The intumescent material according to claim 1, wherein the reinforcing material further comprises a unitized reinforcing element.

11. The intumescent material according to claim 1, wherein the reinforcing material is present in an amount of about 5-15 wt %.

12. The intumescent material 1 according to claim 1, wherein the charring catalyst comprises a phosphate-based charring catalyst.

13. The intumescent material according to claim 1, wherein the charring catalyst comprises ammonium polyphosphate and the charring agent comprises pentaerythritol.

14. The intumescent material according to claim 1, wherein the blowing agent comprises melamine.

15. The intumescent material according to claim 1 having an expansion ratio of 10 or greater.

16. The intumescent material according to claim 1 having an expansion ratio of 15-35.

17. A film comprising the free-standing solid intumescent material as defined in claim 1.

18. The film according to claim 17 having a thickness in a range of about 1-25 mm.

19. A fire protection barrier comprising a film as defined in claim 17.

20. The barrier according to claim 19 in a non-planar shape.

21. A fire protection system comprising a fire protection barrier as defined in claim 19 coated on a substrate.

22. The system according to claim 21, wherein the substrate comprises steel.

23. A process for producing the free-standing solid intumescent material of claim 1, the process comprising melt compounding the hot melt thermoplastic or elastomeric resin, the reinforcing material, the inorganic filler and the intumescent component to form a dry mixture comprising about 30 wt % or less of the resin, based on total weight of the dry mixture.

24. A process for producing a fire protection barrier, comprising: producing the free-standing solid intumescent material of claim 1 by melt compounding the hot melt thermoplastic or elastomeric resin, the reinforcing material, the inorganic filler and the intumescent component to form a dry mixture comprising about 30 wt % or less of the resin, based on total weight of the dry mixture; and, shaping the free-standing solid intumescent material into a fire protection barrier of defined shape.

25. The process according to claim 24, wherein the mixture further comprises a plasticizer present in an amount of about 0.1-10 wt % based on total weight of the mixture.

26. The process according to any one of claim 24, wherein the melt compounding is performed at a temperature of 150° C. or less.

27. The process according to any one of claim 23, wherein the dry mixture comprises about 20 wt % or less of the resin.

28. A method of applying the fire protection barrier as defined in claim 19 to a substrate in need of fire protection, comprising applying a liquid adhesive to the substrate and the free-standing solid intumescent material and immobilizing the fire protection barrier in position on the substrate at least temporarily while the adhesive cures.

29. The method according to claim 28, wherein the substrate comprises steel.

30. The method according to claim 28 further comprising thermally shaping the barrier at a temperature of less than about 150° C. to conform the barrier to the substrate.

31. The intumescent material of claim 1, wherein the intumescent material is free of solvents.

32. The intumescent material of claim 1, wherein the intumescent material is free of silicates.

* * * * *

UNITED STATES PATENT AND TRADEMARK OFFICE
CERTIFICATE OF CORRECTION

PATENT NO. : 10,138,421 B2
APPLICATION NO. : 15/033915
DATED : November 27, 2018
INVENTOR(S) : Jiangdong Tong It is certified that error appears in the above-identified patent and that said Letters Patent is hereby corrected as shown below:

On the Title Page

Column 2 (Abstract), Line 1, Delete "of a of" and insert -- of --, therefor.

In the Specification

Column 2, Lines 32-33, Delete "Akzo Nobel's" and insert -- AkzoNobel's --, therefor.

Column 7, Line 24, Delete "timer" and insert -- trimer --, therefor.

Column 10, Lines 18-19, Delete "Willmington," and insert -- Wilmington, --, therefor.

Column 13, Line 27, Delete "Hakke" and insert -- Haake --, therefor.

In the Claims

Column 17, Line 47, In Claim 12, after "material" delete "1".

Column 18, Line 36, In Claim 26, after "according to" delete "any one of".

Column 18, Line 29 (Approx.), In Claim 27, after "according to" delete "any one of".

Signed and Sealed this
Tenth Day of September, 2019

Andrei Iancu
*Director of the United States Patent and Trademark Office*